US012406487B2

(12) United States Patent
Jia et al.

(10) Patent No.: US 12,406,487 B2
(45) Date of Patent: Sep. 2, 2025

(54) SYSTEMS AND METHODS FOR TRAINING MACHINE-LEARNED VISUAL ATTENTION MODELS

(71) Applicant: Google LLC, Mountain View, CA (US)

(72) Inventors: Xuhui Jia, Seattle, WA (US); Raviteja Vemulapalli, Seattle, WA (US); Bradley Ray Green, Bellevue, WA (US); Bardia Doosti, Bloomington, IN (US); Ching-Hui Chen, Shoreline, WA (US); Yukon Zhu, Shoreline, WA (US)

(73) Assignee: GOOGLE LLC, Mountain View, CA (US)

( * ) Notice: Subject to any disclaimer, the term of this patent is extended or adjusted under 35 U.S.C. 154(b) by 338 days.

(21) Appl. No.: 18/006,078

(22) PCT Filed: Aug. 3, 2020

(86) PCT No.: PCT/US2020/044717
§ 371 (c)(1),
(2) Date: Jan. 19, 2023

(87) PCT Pub. No.: WO2022/031261
PCT Pub. Date: Feb. 10, 2022

(65) Prior Publication Data
US 2023/0281979 A1    Sep. 7, 2023

(51) Int. Cl.
*G06V 10/82* (2022.01)
*G06V 10/776* (2022.01)

(52) U.S. Cl.
CPC ............ *G06V 10/82* (2022.01); *G06V 10/776* (2022.01)

(58) Field of Classification Search
CPC .............................. G06V 10/82; G06V 10/776
See application file for complete search history.

(56) References Cited

U.S. PATENT DOCUMENTS 8,830,164 B2 * 9/2014 Sakata ...................... G06T 7/74
359/630
10,269,177 B2 * 4/2019 Frueh ...................... G06T 17/00
(Continued)

FOREIGN PATENT DOCUMENTS

CN    111259713    6/2020
EP    2515206 A1 * 10/2012 ............. G06F 3/013
(Continued)

OTHER PUBLICATIONS

Asteriadis et al., "Visual Focus of Attention in Non-calibrated Environments using Gaze Estimation" (pp. 293-316). (Year: 2014).*
(Continued)

*Primary Examiner* — Manav Seth
(74) *Attorney, Agent, or Firm* — DORITY & MANNING P.A.

(57) ABSTRACT

Systems and methods of the present disclosure are directed to a method for training a machine-learned visual attention model. The method can include obtaining image data that depicts a head of a person and an additional entity. The method can include processing the image data with an encoder portion of the visual attention model to obtain latent head and entity encodings. The method can include processing the latent encodings with the visual attention model to obtain a visual attention value and processing the latent encodings with a machine-learned visual location model to obtain a visual location estimation. The method can include
(Continued)

training the models by evaluating a loss function that evaluates differences between the visual location estimation and a pseudo visual location label derived from the image data and between the visual attention value and a ground truth visual attention label.

20 Claims, 8 Drawing Sheets

(56) References Cited

U.S. PATENT DOCUMENTS

| | | | |
|---|---|---|---|
| 10,353,465 | B2 | 7/2019 | Qin et al. |
| 10,740,985 | B2 * | 8/2020 | Sommerlade ............ G06T 7/337 |
| 10,922,889 | B2 * | 2/2021 | Palos ..................... G06T 19/006 |
| 11,527,082 | B2 * | 12/2022 | Arora ......................... G06T 7/74 |
| 11,694,419 | B2 * | 7/2023 | Haro ........................ G06T 19/20 345/619 |
| 11,704,931 | B2 * | 7/2023 | Aleem ..................... G06F 3/016 345/7 |
| 11,886,634 | B2 * | 1/2024 | Arar ..................... G06F 18/2148 |
| 12,184,931 | B2 * | 12/2024 | Takaki ............... H04N 21/4722 |
| 12,277,267 | B2 * | 4/2025 | Silva ........................ G06F 3/013 |
| 12,277,738 | B2 * | 4/2025 | Ghebremusse ........... G06T 7/70 |
| 2019/0051057 | A1 * | 2/2019 | Sommerlade ............ G06N 3/08 |
| 2019/0212815 | A1 * | 7/2019 | Zhang ..................... G06V 10/82 |
| 2024/0242458 | A1 | 7/2024 | Sommerlade et al. |

FOREIGN PATENT DOCUMENTS

| | | | |
|---|---|---|---|
| KR | 20160031183 | 3/2016 | |
| WO | WO-2020242085 A1 * | 12/2020 | ......... G02B 27/0093 |

OTHER PUBLICATIONS

Hillaire et al., "Using a Visual Attention Model to Improve Gaze Tracking Systems in Interactive 3D Applications" (pp. 1830-1841). (Year: 2010).*
Smith et al., "Tracking the Visual Focus of Attention for a Varying Number of Wandering People" (pp. 1-15). (Year: 2007).*
Machine Translated Chinese Search Report Corresponding to Application No. 2020801043046 on Dec. 12, 2024.
Marin-Jimenez et al., "LAEO-Net: Revisiting People Looking At Each Other in Videos", IEEE/CVF Conference on Computer Vision and Pattern Recognition (CVPR), 2019, 9 pages.
Zhang et al., "It's Written All Over Your Face: Full-Face Appearance-Based Gaze Estimation", IEEE Conference on Computer Vision and Pattern Recognition Workshops (CVPRW), 2017, 27 pages.
Aung et al., "Who Are They Looking At? Automatic Eye Gaze Following for Classroom Observation Video Analysis", 2018, Database Compendex, Proceedings of the 11$^{th}$ International Conference on Educational Data Mining, XP002802633.
Chong et al., "Detecting Attended Visual Targets in Video", Jun. 13, 2020, IEEE/CVF Conference on Computer Vision and Pattern Recognition, pp. 5395-5405, XP033805577.
International Search Report for Application No. PCT/US2020/044717, mailed on Apr. 26, 2021, 2 pages.
Lian et al., "Believe it or Not, We Know What You Are Looking At!", arxiv.org, Jul. 4, 2019, Cornell University Library, XP081438057.
Mukherjee et al., "Deep Head Pose: Gaze-Direction Estimation in Multimodal Video", IEEE Transactions on Multimedia, IEEE Service Center, vol. 17, No. 11, Nov. 1, 2015, pp. 2094-2107, XP011588123.
Ping et al., "Where and Why are They Looking? Jointly Inferring Human Attention and Intentions in Complex Tasks", Jun. 18, 2018, IEEE/CVF Conference on Computer Vision and Pattern Recognition, pp. 6801-6809, XP033473598.
International Preliminary Report on Patentability for Application No. PCT/US2020/044717, mailed Feb. 16, 2023, 10 pages.

* cited by examiner

SYSTEMS AND METHODS FOR TRAINING MACHINE-LEARNED VISUAL ATTENTION MODELS

PRIORITY CLAIM

This application is based upon and claims the right of priority under 35 U.S.C. § 371 to International Application No. PCT/US2020/044717 filed on Aug. 3, 2020, which is incorporated by reference herein.

FIELD

The present disclosure relates generally to training of machine-learned visual attention models. More particularly, the present disclosure relates to utilization of three-dimensional visual location estimation as a training signal for machine-learned visual attention models.

BACKGROUND

Efficient and accurate machine-learned visual attention estimation has become increasingly important to a variety of technical fields. As an example, augmented reality devices are often required to estimate a person's visual attention to properly generate corresponding objects. As another example, autonomous driving technologies benefit from knowing if the visual attention of a person (e.g., a driver, a pedestrian, etc.) is focused on an additional entity (e.g., a stop sign, an intersection, etc.) to more effectively mitigate the risk of adverse events.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for training a machine-learned visual attention model. The method can include obtaining, by a computing system comprising one or more computing devices, image data and an associated ground truth visual attention label, wherein the image data depicts at least a head of a person and an additional entity. The method can include processing, by the computing system, the image data with an encoder portion of the machine-learned visual attention model to obtain a latent head encoding and a latent entity encoding. The method can include processing, by the computing system, the latent head encoding and the latent entity encoding with the machine-learned visual attention model to obtain a visual attention value indicative of whether a visual attention of the person is focused on the additional entity. The method can include processing, by the computing system, the latent head encoding and the latent entity encoding with a machine-learned three-dimensional visual location model to obtain a three-dimensional visual location estimation, wherein the three-dimensional visual location estimation comprises an estimated three-dimensional spatial location of the visual attention of the person. The method can include evaluating, by the computing system, a loss function that evaluates a difference between the three-dimensional visual location estimation and a pseudo visual location label derived from the image data and a difference between the visual attention value and the ground truth visual attention label. The method can include respectively adjusting, by the computing system, one or more parameters of the machine-learned visual attention model and the machine-learned three-dimensional visual location model based at least in part on the loss function.

Another example aspect of the present disclosure is directed to a computing system for visual attention tasks. The computing system can include one or more processors. The computing system can include a machine-learned visual attention model. The machine-learned visual attention model can be configured to receive image data depicting at least a head of a person and an additional entity. The machine-learned visual attention model can be configured to generate, based on the image data, a visual attention value, wherein the visual attention value is indicative of whether a visual attention of the person is focused on the additional entity. The computing system can include one or more tangible, non-transitory computer readable media storing computer-readable instructions that when executed by the one or more processors cause the one or more processors to perform operations. The operations can include obtaining image data that depicts the at least the head of the person and the additional entity. The operations can include processing the image data with the machine-learned visual attention model to obtain the visual attention value indicative of whether the visual attention of the person is focused on the additional entity, wherein the machine-learned visual attention model is trained based at least in part on an output of a machine-learned three-dimensional visual location model, wherein the output of the machine-learned three-dimensional visual location model comprises an estimated three-dimensional spatial location of the visual attention of at least the person. The operations can include determining, based at least in part on the visual attention value, whether the person is looking at the additional entity.

Another example aspect of the present disclosure is directed to one or more tangible, non-transitory computer readable media storing computer-readable instructions that when executed by one or more processors cause the one or more processors to perform operations. The operations can include obtaining image data that depicts at least a head of a person and an additional entity. The operations can include processing the image data with a machine-learned visual attention model to obtain a visual attention value, wherein the visual attention value is indicative of whether a visual attention of the person is focused on the additional entity, wherein the machine-learned visual attention model is trained based at least in part on an output of a three-dimensional visual location model, wherein the output of the three-dimensional visual location model comprises an estimated three-dimensional spatial location of the visual attention of at least the person. The operations can include determining, based at least in part on the visual attention value, whether the person is looking at the additional entity.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
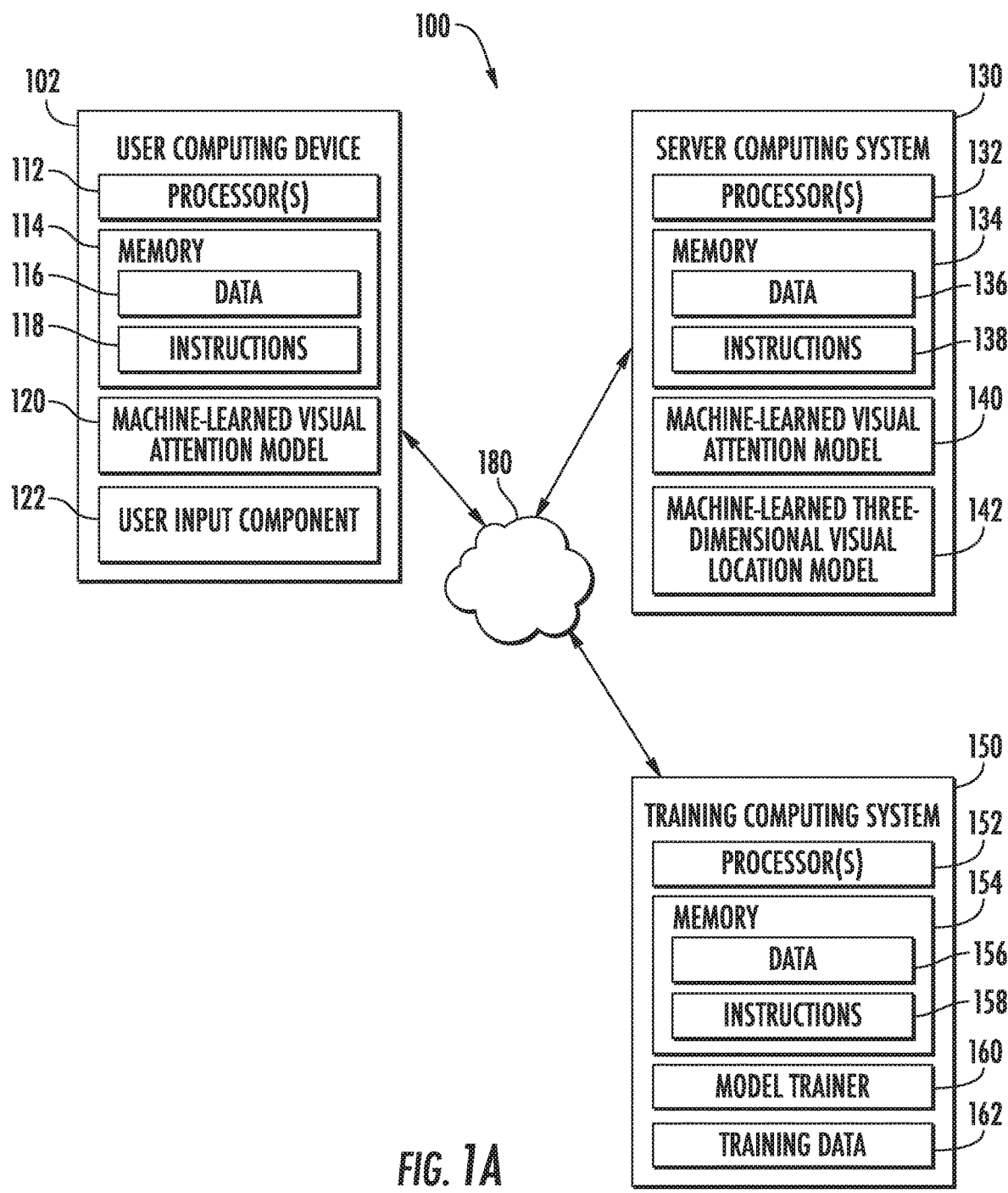
FIG. 1A depicts a block diagram of an example computing system that performs machine-learned visual attention estimation according to example embodiments of the present disclosure.

Reference numerals that are repeated across plural figures are intended to identify the same features in various implementations.

DETAILED DESCRIPTION

Overview

Generally, the present disclosure is directed to training and utilization of machine-learned visual attention models. More particularly, the present disclosure is directed to utilization of three-dimensional visual direction estimation (e.g., using a machine-learned visual location model) to optimize the training and inference-step performance of a machine-learned visual attention model. As an example, image data can be obtained that depicts the head of a person and an additional entity (e.g., an object, a sign, a vehicle, a second person's head, etc.). The image data can be processed using a machine-learned visual attention model to obtain a visual attention value that is indicative of whether a visual attention of the person depicted in the image data is focused on the additional entity (e.g., if the visual attention of the person is focused on a sign, etc.). Further, the image data can also be processed by a machine-learned three-dimensional visual location model to obtain a three-dimensional visual location estimation. The visual location estimation can include an estimated three-dimensional spatial location of the visual attention of the person (e.g., a location of the person's attention in a three-dimensional space, etc.). The visual attention value and the visual location estimation can both respectively be evaluated by a loss function. The loss function can evaluate a difference between the three-dimensional visual location estimation and a pseudo visual location label (e.g., derived from the image data, etc.) and a difference between the visual attention value and a ground truth visual attention label associated with the image data. Based on the loss function, both the machine-learned visual attention model and the machine-learned three-dimensional visual location model can be trained in an end-to-end fashion. In such fashion, the output of the machine-learned three-dimensional visual location model can be utilized as a training signal to more optimally train the machine-learned visual attention model.

More particularly, estimating visual attention of people(s) depicted by image data has become increasingly important in a number of industries. As an example, the determination of whether a person (e.g., a pedestrian, a driver in another vehicle, etc.) is looking at nearby vehicle(s) can be used to increase safety in autonomous driving implementations. As another example, determining whether a user of a wearable computing device (e.g., smart glasses, AR head devices, etc.) is focusing their visual attention on an object (e.g., a visual encoding such as a QR code, etc.), can be used to determine whether the object should be analyzed. As yet another example, determining whether two persons are focusing their visual attention on one another (e.g., looking at each other) can be utilized to determine if either person is focusing their respective visual attention on each other or on objects in the same field of view (e.g., if a person is looking at a second person or at a vehicle located behind the second person, etc.).

Accordingly, aspects of the present disclosure are directed to systems and methods for more optimally training a machine-learned visual attention model. More particularly, computing system(s) of the present disclosure can obtain image data and an associated ground truth visual attention label. The image data can depict at least a head of a person and an additional entity. The image data can be any image data captured by any sort of image capture device (e.g., digital camera, LIDAR sensor, etc.), and be or otherwise include data of any image data type (e.g., digital camera data, LIDAR data, etc.). In some implementations, the head of the person depicted in the image data can be a portion of the head of the person. As an example, the image data can depict the eyes of a person (e.g., as captured from an augmented reality device, a virtual reality device, a front-side smartphone image sensor, etc.). As such, the image data can, in some implementations, depict the face of a user of a computing device and a scene opposite that of the face of the user device (e.g., the environment that the user is viewing, etc.).

The additional entity depicted by the image data can be at least a portion of an object, person direction surface, space, machine-readable visual encoding, and/or any other entity depicted in the image data. As an example, the additional entity can be a surface of a building. As another example, the additional entity can be the head of another person. As another example, the additional entity can be a machine-readable visual encoding (e.g., a QR code, etc.). As another example, the additional entity can be a defined three-dimensional portion of space (e.g., a road intersection, a portion of three-dimensional space where a pedestrian could appear, etc.). As another example, the additional entity can be a direction. As another example, the additional entity can be an object (e.g., a computing device, a vehicle, a sign, etc.). As such, the additional entity can be any entity that can receive visual attention from a person.

In some implementations, the image data can include or otherwise depict bounding boxes respectively associated with the head of the person and the additional entity (e.g., as a ground truth of the image data). As an example, the image data may depict the head of a person and an additional entity that is a machine-readable visual encoding (e.g., a QR code). Two bounding boxes can be depicted in the image data that respectively define box areas around the head and the visual encoding. It should be noted that in some implementations, the image data can also include additional information regarding the size, position, location, and coordinates of the bounding box(es) included as a ground truth of the image data (e.g., as image data characteristics, etc.).

In some implementations, a spatial encoding feature vector can be generated based at least in part on a plurality of image data characteristics of the image data. The spatial encoding feature vector can include a two-dimensional spatial encoding and a three-dimensional spatial encoding. As an example, the spatial encoding feature vector can be an 11-dimensional feature vector that includes an 8-dimensional 2D spatial encoding and a 3-dimensional 3D spatial encoding.

In some implementations, the image data characteristics can include the dimensions, content, file size, file format, pixel count, and/or any other relevant characteristics of the image data. As an example, the image data characteristics may include a height value and a width value of the image data (e.g., a height/width pixel count, aspect ratio, etc.). As another example, the image data characteristics can include two-dimensional location coordinates for one or more of the bounding boxes included in the image data (e.g., the head bounding box, the additional entity bounding box, etc.). As yet another example, the image data characteristics can include an estimated camera focal length that was used to capture the image data (e.g., an estimation of the utilized camera focal length when the image data was captured, etc.). The estimated camera focal length can be estimated based at least in part on the height value and the width value of the image data.

In some implementations, the two-dimensional spatial encoding of the spatial encoding feature vector can describe one or more of the plurality of image data characteristics. As an example, the two-dimensional spatial encoding may describe the respective two-dimensional location coordinates within the image data for each of the head bounding box and the entity bounding box (e.g., normalized X/Y center coordinates of the boxes, etc.). As another example, two-dimensional spatial encoding may additionally or alternatively include a height value and a weight value of the image data. It should be noted that the two-dimensional spatial encoding does not necessarily need to describe each image data characteristic of the plurality of image data characteristics.

In some implementations, the three-dimensional spatial encoding of the spatial encoding feature vector can describe a pseudo three-dimensional relative position of both the head of the person and the additional entity. More particularly, three-dimensional spatial encoding can describe a relative position of the head of the person and the additional entity (e.g., their respectively relative positions in a three-dimensional space. As an example, the additional entity depicted by the image data can be a head of second person. The three-dimensional spatial encoding can describe a pseudo three-dimensional position of the first person's head relative to the second person's head and a pseudo three-dimensional position of the second person's head relative to the first person's head. In some implementations, the three-dimensional spatial encoding can additionally describe a pseudo three-dimensional gaze direction of the first person and/or the additional entity (e.g., if the additional entity is a second person). The generation of the three-dimensional spatial encoding of the spatial encoding feature vector will be described in greater detail with regards to FIG. 5.

The image data can be processed with an encoder portion of the machine-learned visual attention model to obtain a latent head encoding (e.g., an encoding of the head of the person) and a latent entity encoding (e.g., an encoding of the additional entity). The encoder portion of the machine-learned visual attention model can be one or more encoding layers of the model that are configured to generate both latent encodings. Alternatively, in some implementations, the encoder portion can be a machine-learned encoding submodel of the machine-learned visual attention model. In some implementations, the encoder portion can be a shared portion that can be used to generate encodings for both the head of the person and the additional entity. Alternatively, in some implementations, the encoder portion can include two encoder portions that are used separately for the head of the person and the additional entity without any sharing of parameters. The machine-learned visual attention model can be or otherwise include various machine-learned model(s) such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

As an example, the encoder portion of the machine-learned visual attention model can be or otherwise include a shared convolutional neural network with four two-dimensional convolutional layers that can output two 12-dimensional feature vectors for the head of the person and the additional entity respectively. As another example, the machine-learned visual attention model (e.g., including or excluding the encoder portion, etc.), can include a neural network that consists of three fully-connected layers with 16, 8, and 1 output nodes, respectively. The input to this neural network can be a 35-dimensional feature vector obtained by concatenating the latent head encoding, the latent entity encoding, and the spatial encoding feature vector. The first two layers of the network can use ReLU non-linearity, and the last layer can use a sigmoid function to generate the visual attention value in a [0,1] range (e.g., a binary visual attention value, etc.).

In some implementations, the machine-learned visual attention model can include a depth estimation portion to provide depth estimation data for the person and/or additional entity depicted in the image data. As an example, the depth estimation portion can be configured to provide depth estimation data that indicates an estimated depth for the person and the additional entity relative to the person. The depth estimation data can then be utilized alongside the latent encodings to provide a more accurate visual attention value.

The latent head encoding and the latent entity encoding can be processed with the machine-learned visual attention model to obtain a visual attention value. The visual attention value can be indicative of whether a visual attention of the person is focused on the additional entity. In some implementations, the visual attention value can be a binary value indicating that the person is either looking at the additional entity or is not looking at the additional entity. Alternatively, in some implementations, the visual attention value can be a scalar value indicative of a degree of certainty as to whether the visual attention of the person is focused on the additional entity (e.g., a 75% certainty that the visual attention of the person is focused on the additional entity, etc.).

Alternatively, in some implementations, the visual attention value can be indicative of a degree of visual attention focused on the additional entity.

In some implementations, the spatial encoding feature vector previously generated based on the image data characteristics can be input alongside the latent space head encoding and the latent space entity encoding to the machine-learned visual attention model to obtain the visual attention value. As an example, the latent head encoding, the latent entity encoding, and the spatial encoding feature vector can be concatenated to a 35-dimensional feature vector. This 35-dimensional feature vector can then be input to the machine-learned visual attention model to obtain the visual attention value.

The latent head encoding and the latent entity encoding can be processed with a machine-learned three-dimensional visual location model to obtain a three-dimensional visual location estimation. The three-dimensional visual location estimation can include an estimated three-dimensional spatial location of the visual attention of the person. The machine-learned three-dimensional visual location model can be or otherwise include various machine-learned model (s) such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. As an example, the machine-learned three-dimensional visual location model can include two fully-connected layers with 6 and 3 respective output nodes, followed by a unit normalization layer. For example, the first of the two fully-connected layers can be or otherwise utilize a ReLu activation function and the second of the two fully-connected layers can be or otherwise include a linear layer.

As described previously, the three-dimensional visual location estimation can include an estimated three-dimensional spatial location of the visual attention of the person. As an example, the additional entity depicted in the image data can be a machine-readable visual encoding. The estimated three-dimensional spatial location of the visual attention can be the three-dimensional location of machine-readable visual encoding. As another example, the estimated three-dimensional spatial location of the visual attention can be described by a three-dimensional directional vector that is directed towards the location of the machine-readable visual encoding. As such, the three-dimensional visual location estimation can estimate a visual direction and/or a visual depth of the gaze of the person depicted in the image data.

In some implementations, the machine-learned three-dimensional visual location model can be utilized as a three-dimensional gaze estimation network. More particularly, the machine-learned three-dimensional visual location model can provide an output that estimates the gaze of one or more persons depicted in the image data. As an example, the image data can depict a person. The machine-learned three-dimensional visual location model can output an estimation of the gaze of the person (e.g., a visual location of the gaze, a visual attention of the gaze, etc.).

A loss function can be evaluated that evaluates a difference between the three-dimensional visual location estimation and a pseudo visual location label derived from the image data. In some implementations, the pseudo visual location label can be based at least in part on the three-dimensional spatial encoding of the spatial encoding feature vector. As an example, the three-dimensional spatial encoding can include one or more 3D positioning vectors that describe a position and/or spatial direction of the head in a 3D space (e.g., and the additional entity if the additional entity is a second person, etc.). The 3D positioning vector(s) can be utilized as a pseudo visual location label, and the 3D location and/or direction of the head of the person indicated by the pseudo visual location label evaluated against the three-dimensional visual location estimation. As the pseudo visual location label is based at least in part on the spatial encoding feature vector, which is itself based at least in part on the coordinates of bounding boxes included in the image data (e.g., as a ground truth associated with the image data), the pseudo visual location label can provide an accurate unsupervised training signal that benefits from the known accuracy of a ground truth associated with the image data (e.g., the bounding box coordinates). In such fashion, the previously generated spatial encoding feature vector can be evaluated by the loss function as an unsupervised training signal to optimize the performance of both the machine-learned three-dimensional visual location model and the machine-learned visual attention model.

The loss function can also evaluate a difference between the visual attention value and the ground truth visual attention label. The ground truth visual attention label can be of the same type as the visual attention value (e.g., a binary value, an accuracy likelihood, etc.). As an example, the visual attention value can indicate that the visual attention of the person is focused on the additional entity and the ground truth visual attention label can indicate that the visual attention of the person is not focused on the entity. The loss function can evaluate the difference between the visual attention value and the ground truth visual attention label. As another example, the ground truth visual attention label can indicate a 55% likelihood that the visual attention of the person is focused on the additional entity. The ground truth visual attention label can indicate either indicate that the visual attention of the person is focused on the entity (e.g., a binary value) or a different degree of certainty that the visual attention of the person is focused on the additional entity (e.g., 25%, 75%, etc.). In such fashion, the loss function can evaluate a difference between both the visual attention value and the ground truth visual attention label, and the three-dimensional visual location estimation and the pseudo visual location label, and can be back propagated to train both the machine-learned visual attention model and the machine-learned three-dimensional visual location model to train the models in an end-to-end fashion.

Based at least in part on the loss function, parameter(s) of the machine-learned visual attention model and the machine-learned three-dimensional visual location model can be adjusted. More particularly, the differences evaluated by the loss function can be backpropagated through both models separately and simultaneously. For example, the loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

More particularly, the machine-learned visual attention model and the machine-learned three-dimensional visual location model can, in some implementations, be trained in an end-to-end fashion starting from randomly initialized weights using two loss functions: binary cross entropy loss $\mathcal{L}_{bce}$ on the visual attention value(s) and $\mathcal{L}_2$ loss on the three-dimensional visual location estimates. While the visual attention value loss can be used for both positive and negative visual attention samples, the three-dimensional visual location estimation loss can generally be used only for positive (e.g., a label indicating that the person is focusing their visual attention on the additional entity, etc.) visual attention value samples (e.g., using the pseudo visual location label). The overall loss function used for such training can be defined as:

$$\mathcal{L} = \mathcal{L}_{bce}(\hat{l}, l) + \lambda l \left( \frac{\mathcal{L}_2(\hat{g}_1, v) + \mathcal{L}_2(\hat{g}_2, -v)}{2} \right),$$

where $l \in \{0,1\}$ is the binary ground truth visual attention label, $\hat{l} \in [0,1]$ is the predicted visual attention value score, $\hat{g}_1$ and $\hat{g}_2$ are the respective three-dimensional visual location estimates for a first head and a second head (e.g., assuming that the additional entity is a second head of a second person, etc.), respectively, and $\lambda$ is a hyper-parameter to balance the importance of two loss functions.

After training of the machine-learned visual attention model, the machine-learned visual attention model can be utilized separately (e.g., without the additional utilization of the machine-learned three-dimensional visual location model) to determine whether the person is looking at the additional entity depicted in the image data (e.g., whether the visual attention of the person is focused on the additional entity, etc.). As described previously, the additional entity depicted by the image data can be or otherwise include at least a portion of an object, person direction surface, space, machine-readable visual encoding, and/or any other entity depicted in the image data. As an example, the additional entity can be a surface of a building. As another example, the additional entity can be the head of another person. As another example, the additional entity can be a machine-readable visual encoding (e.g., a QR code, etc.). As another example, the additional entity can be a defined three-dimensional portion of space (e.g., a road intersection, a portion of three-dimensional space where a pedestrian could appear, etc.). As another example, the additional entity can be a direction. As another example, the additional entity can be an object (e.g., a computing device, a vehicle, a sign, etc.). As such, the additional entity can be any entity that can receive visual attention from a person.

In some implementations, as described during the training phase, the image data can be processed with the machine-learned visual attention model to obtain a visual attention value. Based on the visual attention value, it can be determined whether the person is looking at the additional entity (e.g., determining that the person is looking at the additional entity, determining that the person is not looking at the additional entity, etc.).

In some implementations, after one or more iterations of adjustments to parameter(s) of at least the machine-learned visual attention model, the machine-learned visual attention model can be utilized to determine the visual attention of two persons. As an example, second image data can be obtained that depicts at least a third head of a third person and a fourth head of a fourth person. The second image data can be processed with the machine-learned visual attention model to obtain a second visual attention value. The second visual attention value can indicate whether a visual attention of the third person is focused on the fourth person and a visual attention of the fourth person is focused on the third person. Based on the visual attention value, it can be determined that the third person and the fourth person are looking at each other. In such fashion, the trained machine-learned visual attention model can be utilized to predict whether the visual attention of two people are respectively focused on each other.

In some implementations, one or more actions can be performed in response to determining that the person is looking at the additional entity. More particularly, the computing system including the machine-learned visual attention model can perform action(s) in response to determining that the person is looking at the additional entity or that two persons are looking at each other. As an example, it can be determined that a driver of a vehicle is not looking at an additional entity (e.g., an oncoming vehicle, a pedestrian, a stoplight, etc.). In response, one or more actions can be performed (e.g., or instructions can be provided to induce action(s), etc.) to reduce the chances of an adverse event (e.g., stopping the car, steering the car, alerting the driver, etc.).

As another example, a user utilizing a mobile computing device (e.g., an augmented reality wearable computing device, a smartphone, etc.) can obtain image data depicting a person (e.g., the eyes and/or head of the user) and a machine-readable visual encoding (e.g., a QR code, a bar code, a proprietary QR-like visual encoding, etc.). In response to determining that the person is looking at the machine-readable visual encoding, the computing device (e.g., or an associated computing device, etc.) can analyze the machine-readable visual encoding to determine one or more actions performable by the computing device, and can perform the one or more actions described by the machine-readable visual encoding. For example, the computing device may, in response to determining the action(s) described by the machine-readable visual encoding, provide image data (e.g., 2D and/or 3D augmented reality object(s), 2D image(s), portion(s) of text, virtual reality environment(s), webpage(s), video(s), etc.) to a display device of a user (e.g., a smartphone display, an augmented reality computing device, etc.).

In some implementations, the image data can be labeled with a label that indicates the image data depicts two people looking at each other. Alternatively, in some implementations, the label can indicate that the person is looking at the additional entity and the identity of the additional entity (e.g., via use of one or more machine-learned object recognition techniques, etc.).

It should be noted that a variety of actions can be performed in response to determining that the person is looking at the additional entity. As an example, the computing device may, in response to determining the action(s) described by the machine-readable visual encoding, provide data to other computing system(s) (e.g., via one or more networks), retrieve data from one or more computing system(s) (e.g., content distribution network(s), etc.), establish a secure connection with another computing system configured to facilitate one or more secure transactions, or any other actions described by the machine-readable visual encoding.

Additionally, or alternatively, in some implementations, the machine-learned three-dimensional visual location model can be utilized alongside the machine-learned visual attention model to generate a more accurate visual attention value. More particularly, the $\hat{g}_1$ and $\hat{g}_2$ can be respectively defined as the pseudo visual location labels generated by the network (e.g., the machine-learned three-dimensional visual location model, etc.) for the latent head encoding and the latent entity encoding, respectively, and v can represent the relative three-dimensional spatial location encoding computed as part of the spatial encoding feature vector. If, as an example, two people are looking at each other, the three-dimensional location of their respective visual attention directions can roughly align with their relative three-dimensional visual location estimations. Based on this observation, we compute a LAEO score using the alignment of $\hat{g}_1$ and $\hat{g}_2$ with v and −v, respectively:

$$\hat{l}_G = \left(0.5 + \frac{\hat{g}_1 \cdot v}{2\|\hat{g}_1\|_2\|v\|_2}\right)\left(0.5 - \frac{\hat{g}_2 \cdot v}{2\|\hat{g}_2\|_2\|v\|_2}\right).$$

The first term in the score $\hat{l}_G$ as described above can measure the alignment between $\hat{g}_1$ and v, and the second term can measure the alignment between $\hat{g}_2$ and −v.

The present disclosure provides a number of technical effects and benefits. As one example technical effect and benefit, the systems and methods of the present disclosure enable more efficient training of a machine-learned visual attention model, which therefore allows a number of technical fields to operate more effectively. As an example, augmented reality devices are often required to estimate a person's visual attention to properly generate corresponding objects. By increasing the accuracy of visual attention estimation, the present disclosure can increase user satisfaction and efficiency by reducing the number of inaccurate visual attention estimates. As another example, autonomous driving technologies benefit from knowing if the visual attention of a person (e.g., a driver, a pedestrian, etc.) is focused on an additional entity (e.g., a stop sign, an intersection, etc.) to more effectively mitigate the risk of adverse events. By more accurately estimating visual attention, systems and methods of the present disclosure can significantly increase the safety of both drivers and pedestrians. As such, the present disclosure can drastically increase the accuracy of visual attention estimation, therefore providing a number of benefits across a variety of technical fields.

With reference now to the Figures, example embodiments of the present disclosure will be discussed in further detail.

Example Devices and Systems

FIG. 1A depicts a block diagram of an example computing system 100 that performs visual attention estimation according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned visual attention models 120. For example, the machine-learned visual attention models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example OVERALL models 120 are discussed with reference to FIGS. 2-4.

In some implementations, the one or more machine-learned visual attention models 120 can be received from the server computing system 130 over network 180, stored in the user computing device memory 114, and then used or otherwise implemented by the one or more processors 112. In some implementations, the user computing device 102 can implement multiple parallel instances of a single machine-learned visual attention model 120 (e.g., to perform parallel visual attention estimation across multiple instances of the machine-learned visual attention model 120).

More particularly, the user computing device 102 can obtain image data that depicts at least the head of the person and an additional entity. The user computing device 102 can process the image data with the machine-learned visual attention model 120 to obtain the visual attention value indicative of whether the visual attention of the person is focused on the additional entity. The machine-learned visual attention model 120 of the user computing device 102 can be trained based at least in part on an output of the machine-learned three-dimensional visual location model 142 (e.g., at the server computing system, at another instance of the machine-learned three-dimensional visual location model 142 located at the user computing device, etc.). The output of the machine-learned three-dimensional visual location model 142 can include an estimated three-dimensional spatial location of the visual attention of at least the person. The user computing device 102 can determine, based at least in part on the visual attention value, whether the person is looking at the additional entity.

Additionally, or alternatively, one or more machine-learned visual attention models 140 can be included in or otherwise stored and implemented by the server computing system 130 that communicates with the user computing device 102 according to a client-server relationship. For example, the machine-learned visual attention models 140 can be implemented by the server computing system 140 as a portion of a web service (e.g., a visual attention estimation service). Thus, one or more models 120 can be stored and implemented at the user computing device 102 and/or one or more models 140 can be stored and implemented at the server computing system 130.

Additionally, the machine-learned visual attention model 140 can be trained (e.g., in an end-to-end fashion, etc.) in conjunction with a machine-learned three-dimensional visual location model 142 at the server computing system 130 and/or the training computing system 150. After training, the machine-learned visual attention model 140 can be sent to the user computing device 102 (e.g., via network(s) 180). Alternatively, or additionally, in some implementations, the user computing device can train the machine-learned visual attention model 120 in conjunction with another instance of the machine-learned three-dimensional visual location model 142. The conjunctive training of the models 140 and 142 will be discussed in greater detail with regards to FIGS. 3 and 4.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned visual attention models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2-4.

The user computing device 102 and/or the server computing system 130 can train the models 120, 140 and/or 142 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120, 140, and/or 142 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the OVERALL models 120, 140 and/or 142 based on a set of training data 162. The training data 162 can include, for example, image data and an associated ground truth visual attention label. The image data can depict at least a head of a person and an additional entity. The image data can be any image data captured by any sort of image capture device (e.g., digital camera, LIDAR sensor, etc.), and be or otherwise include data of any image data type (e.g., digital camera data, LIDAR data, etc.). In some implementations, the head of the person depicted in the image data can be a portion of the head of the person. As an example, the image data can depict the eyes of a person (e.g., as captured from an augmented reality device, a virtual reality device, a front-side smartphone image sensor, etc.). As such, the image data can, in some implementations, depict the face of a user of a computing device and a scene opposite that of the face of the user device (e.g., the environment that the user is viewing, etc.).

The additional entity depicted by the image data can be at least a portion of an object, person direction surface, space, machine-readable visual encoding, and/or any other entity depicted in the image data. As an example, the additional entity can be a surface of a building. As another example, the additional entity can be the head of another person. As another example, the additional entity can be a machine-readable visual encoding (e.g., a QR code, etc.). As another example, the additional entity can be a defined three-dimensional portion of space (e.g., a road intersection, a portion of three-dimensional space where a pedestrian could appear, etc.). As another example, the additional entity can be a direction. As another example, the additional entity can be an object (e.g., a computing device, a vehicle, a sign, etc.). As such, the additional entity can be any entity that can receive visual attention from a person.

In some implementations, the image data can include or otherwise depict bounding boxes respectively associated with the head of the person and the additional entity (e.g., as a ground truth of the image data). As an example, the image data may depict the head of a person and an additional entity that is a machine-readable visual encoding (e.g., a QR code). Two bounding boxes can be depicted in the image data that respectively define box areas around the head and the visual encoding. It should be noted that in some implementations, the image data can also include additional information regarding the size, position, location, and coordinates of the bounding box(es) included as a ground truth of the image data (e.g., as image data characteristics, etc.).

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
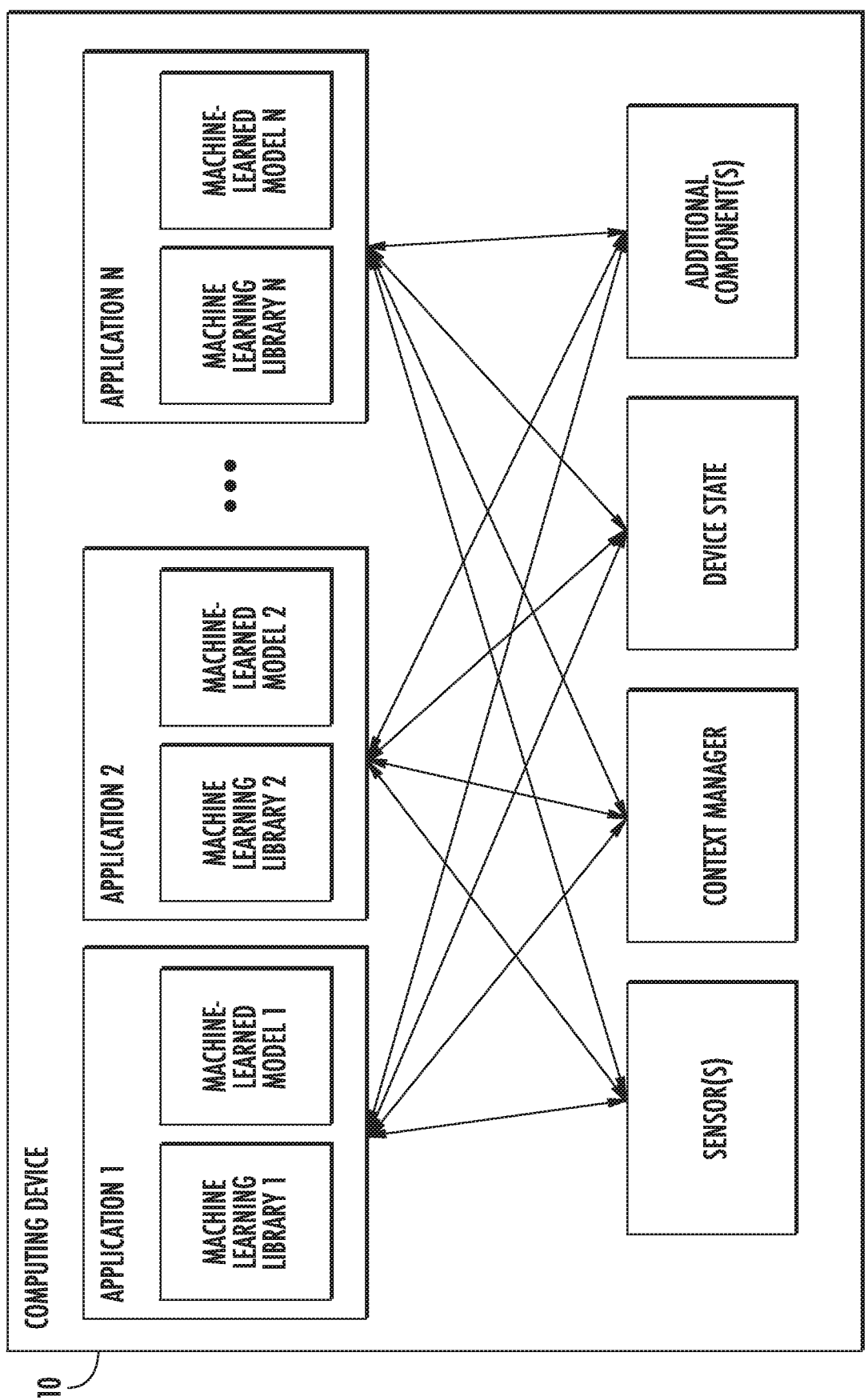
FIG. 1B depicts a block diagram of an example computing device that performs end-to-end training of a machine-learned visual attention model and a machine-learned three-dimensional visual location model according to example embodiments of the present disclosure.

FIG. 1B depicts a block diagram of an example computing device 10 that performs end-to-end training of a machine-learned visual attention model and a machine-learned three-dimensional visual location model to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
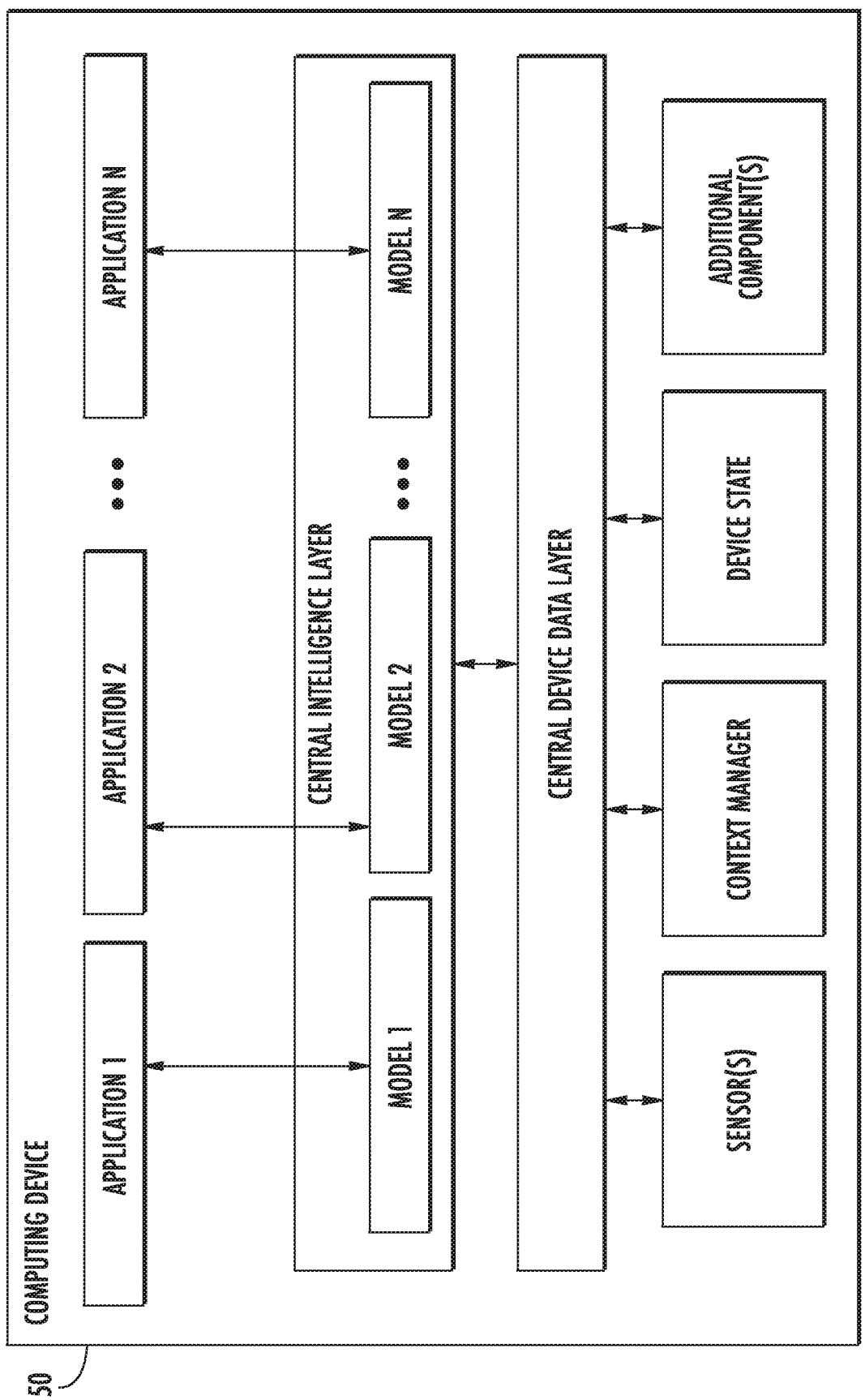
FIG. 1C depicts a block diagram of an example computing device that performs machine-learned visual attention estimation according to example embodiments of the present disclosure.

FIG. 1C depicts a block diagram of an example computing device 50 that performs machine-learned visual attention estimation according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2:
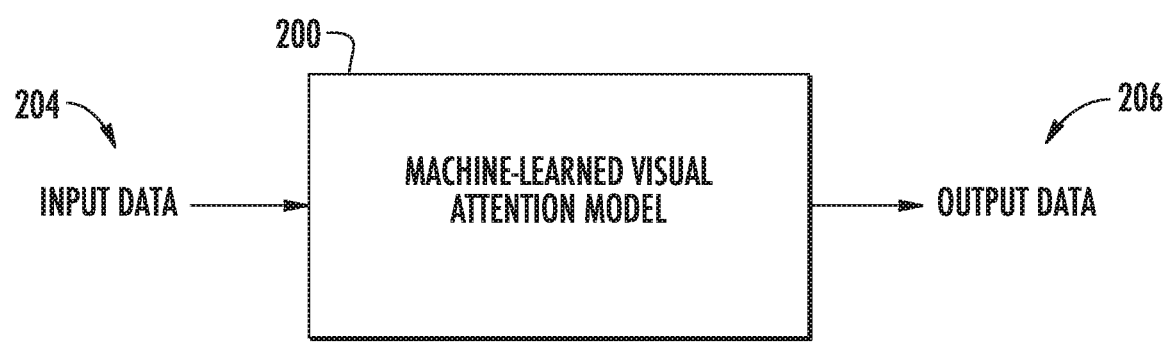
FIG. 2 depicts a block diagram of an example machine-learned visual attention model according to example embodiments of the present disclosure.

FIG. 2 depicts a block diagram of an example machine-learned visual attention estimation model 200 according to example embodiments of the present disclosure. In some implementations, the machine-learned visual attention estimation model 200 is trained to receive a set of input data 204 descriptive of image data and an associated ground truth visual attention label, and, as a result of receipt of the input data 204, provide output data 206 that includes a visual attention label indicative of whether the visual attention of a person depicted in the image data is focused on an additional entity depicted in the image data.

More particularly, the machine-learned visual attention model 200 can be utilized to determine whether the person is looking at the additional entity depicted in the image data 204 (e.g., whether the visual attention of the person is focused on the additional entity, etc.). As described previously, the additional entity depicted by the image data 204 can be or otherwise include at least a portion of an object, person direction surface, space, machine-readable visual encoding, and/or any other entity depicted in the image data. As an example, the additional entity can be a surface of a building. As another example, the additional entity can be the head of another person. As another example, the additional entity can be a machine-readable visual encoding (e.g., a QR code, etc.). As another example, the additional entity can be a defined three-dimensional portion of space (e.g., a road intersection, a portion of three-dimensional space where a pedestrian could appear, etc.). As another example, the additional entity can be a direction. As another example, the additional entity can be an object (e.g., a computing device, a vehicle, a sign, etc.). As such, the additional entity can be any entity that can receive visual attention from a person.

The image data 204 can be processed with the machine-learned visual attention model 200 to obtain a visual attention value 206. Based on the visual attention value 206, it can be determined whether the person is looking at the additional entity (e.g., determining that the person is looking at the additional entity, determining that the person is not looking at the additional entity, etc.).

Figure 3:
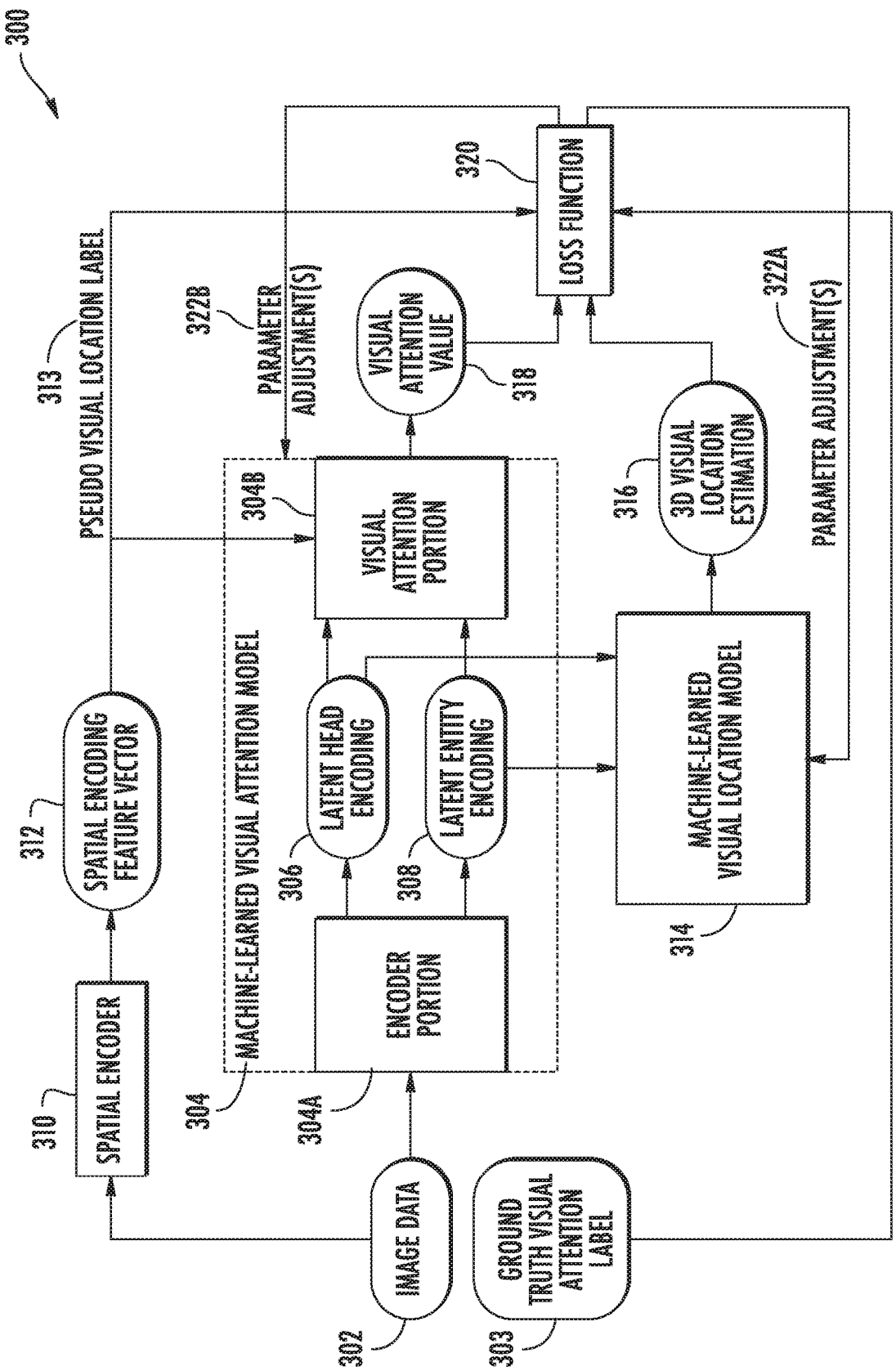
FIG. 3 is a data flow diagram depicting end-to-end training of a machine-learned visual attention model and a machine-learned three-dimensional visual location model according to example embodiments of the present disclosure.

FIG. 3 is a data flow diagram 300 depicting end-to-end training of a machine-learned visual attention model 304 and a machine-learned three-dimensional visual location model 314 according to example embodiments of the present disclosure. More particularly, image data 302 and an associated ground truth visual attention label 303 can be obtained by various computing device(s) and or system(s) of the present disclosure. The image data 302 can depict at least a head of a person and an additional entity. The image data 302 can be any image data 302 captured by any sort of image capture device (e.g., digital camera, LIDAR sensor, etc.), and be or otherwise include data of any image data type (e.g., digital camera data, LIDAR data, etc.). In some implementations, the head of the person depicted in the image data 302 can be a portion of the head of the person. As an example, the image data 302 can depict the eyes of a person (e.g., as captured from an augmented reality device, a virtual reality device, a front-side smartphone image sensor, etc.). As such, the image data 302 can, in some implementations, depict the face of a user of a computing device and a scene opposite that of the face of the user device (e.g., the environment that the user is viewing, etc.).

The additional entity depicted by the image data 302 can be at least a portion of an object, person direction surface, space, machine-readable visual encoding, and/or any other entity depicted in the image data. As an example, the additional entity can be a surface of a building. As another example, the additional entity can be the head of another person. As another example, the additional entity can be a machine-readable visual encoding (e.g., a QR code, etc.). As another example, the additional entity can be a defined three-dimensional portion of space (e.g., a road intersection, a portion of three-dimensional space where a pedestrian could appear, etc.). As another example, the additional entity can be a direction. As another example, the additional entity can be an object (e.g., a computing device, a vehicle, a sign, etc.). As such, the additional entity can be any entity that can receive visual attention from a person.

The image data 302 can be processed with an encoder portion 304A of the machine-learned visual attention model 304 to obtain a latent head encoding 306 (e.g., an encoding of the head of the person) and a latent entity encoding 308 (e.g., an encoding of the additional entity). The encoder portion 304A of the machine-learned visual attention model 304 can be one or more encoding layers of the model that are configured to generate both latent encodings (e.g., 306 and 308). Alternatively, in some implementations, the encoder portion 304A can be a machine-learned encoding submodel of the machine-learned visual attention model 304. In some implementations, the encoder portion 304A can be a shared portion that can be used to generate encodings for both the head of the person and the additional entity. Alternatively, in some implementations, the encoder portion 304A can include two encoder portions that are used separately for the head of the person and the additional entity without any sharing of parameters. The machine-learned visual attention model 304 can be or otherwise include various machine-learned model(s) such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

Further, the image data 302 can be processed (e.g., using a spatial encoder 310) to generate a spatial encoding feature vector 312. The spatial encoding feature vector 312 can be based at least in part on a plurality of image data characteristics of the image data 302. The spatial encoding feature vector 312 can include a two-dimensional spatial encoding and a three-dimensional spatial encoding. As an example, the spatial encoding feature vector can be an 11-dimensional feature vector that includes an 8-dimensional 2D spatial encoding and a 3-dimensional 3D spatial encoding.

The three-dimensional spatial encoding of the spatial encoding feature vector 312 can describe a pseudo three-dimensional relative position of both the head of the person and the additional entity. More particularly, three-dimensional spatial encoding can describe a relative position of the head of the person and the additional entity (e.g., their respectively relative positions in a three-dimensional space. As an example, the additional entity depicted by the image data can be a head of second person. The three-dimensional spatial encoding can be or otherwise describe a pseudo three-dimensional position of the first person's head relative to the second person's head and a pseudo three-dimensional position of the second person's head relative to the first person's head. In some implementations, the three-dimensional spatial encoding can additionally describe a pseudo three-dimensional gaze direction of the first person and/or the additional entity (e.g., if the additional entity is a second person). As such, the three-dimensional spatial encoding of the spatial encoding feature vector 312 can be used to generate a pseudo visual location label 313 to serve as an unsupervised training signal to be evaluated by the loss function 320.

The latent head encoding 306 and the latent entity encoding 308 can be processed with the machine-learned visual attention model 304 (e.g., with a visual attention portion 304B of the machine-learned visual attention model 304) to obtain a visual attention value 318. The visual attention value 318 can be indicative of whether a visual attention of the person is focused on the additional entity. In some implementations, the visual attention value 318 can be a binary value indicating that the person is either looking at the additional entity or is not looking at the additional entity. Alternatively, in some implementations, the visual attention value 318 can be a scalar value indicative of a degree of certainty as to whether the visual attention of the person is focused on the additional entity (e.g., a 75% certainty that the visual attention of the person is focused on the additional entity, etc.). Alternatively, in some implementations, the visual attention value 318 can be indicative of a degree of visual attention focused on the additional entity.

The spatial encoding feature vector 312 can be input alongside the latent head encoding 306 and the latent entity encoding 308 to the machine-learned visual attention model 304 (e.g., to the visual attention portion 304B of the machine-learned visual attention model 304, etc.) to obtain the visual attention value 304B. As an example, the latent head encoding 306, the latent entity encoding 308, and the spatial encoding feature vector 312 can be concatenated to a 35-dimensional feature vector. This 35-dimensional feature vector can then be input to the machine-learned visual attention model 304 (e.g., to the visual attention portion 304B of the machine-learned visual attention model 304, etc.) to obtain the visual attention value 318.

The latent head encoding 306 and the latent entity encoding 308 can be processed with a machine-learned three-dimensional visual location model 314 to obtain a three-dimensional visual location estimation 316. The three-dimensional visual location estimation 316 can include an estimated three-dimensional spatial location of the visual attention of the person. The machine-learned three-dimensional visual location model 314 can be or otherwise include various machine-learned model(s) such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

As described previously, the three-dimensional visual location estimation 316 can include an estimated three-dimensional spatial location of the visual attention of the person. As an example, the additional entity depicted in the image data can be a machine-readable visual encoding. The estimated three-dimensional spatial location 316 of the visual attention can be the three-dimensional location of machine-readable visual encoding. As another example, the estimated three-dimensional spatial location 316 of the visual attention can be described by a three-dimensional directional vector that is directed towards the location of the machine-readable visual encoding. As such, the three-dimensional visual location estimation 316 can estimate a visual direction and/or a visual depth of the gaze of the person depicted in the image data.

A loss function 320 can be evaluated that evaluates a difference between the three-dimensional visual location estimation 316 and the pseudo visual location label 313 derived from the image data 302. More particularly, as depicted, the pseudo visual location label 313 can be based at least in part on the three-dimensional spatial encoding of the spatial encoding feature vector 312. The loss function 320 can further evaluate a difference between the visual attention value 318 and the ground truth visual attention label 303. The ground truth visual attention label 303 can be of the same type as the visual attention value 318 (e.g., a binary value, an accuracy likelihood, etc.). As an example, the visual attention value 318 can indicate that the visual attention of the person is focused on the additional entity and the ground truth visual attention label 303 can indicate that the visual attention of the person is not focused on the entity. The loss function 320 can evaluate the difference between the visual attention value and the ground truth visual attention label.

Based at least in part on the loss function 320, parameter adjustment(s) 322A and 322B can be generated respectively for the machine-learned visual attention model 304 and the machine-learned three-dimensional visual location model 314. More particularly, the differences evaluated by the loss function 320 can be backpropagated through the models 304 and 3414 separately and simultaneously. For example, the loss function 320 can be backpropagated through the model(s) 304/314 to update one or more parameters of the model(s) 304/314 (e.g., based on a gradient of the loss function) based on parameter adjustment(s) 322A/322B. Various loss functions 320 can be used such as mean squared error, likelihood loss, cross entropy loss, hinge loss, and/or various other loss functions. Gradient descent techniques can be used to iteratively update the parameters over a number of training iterations.

It should be noted that, in some implementations, the machine-learned three-dimensional visual location model 314 can be utilized specifically in the training phase to optimize the training of the machine-learned visual attention model 304. More particularly, the machine-learned visual attention model 304 can be utilized without an output of the machine-learned visual location model 314 during an inference phase (e.g., after the parameters of the machine-learned visual attention model 304 have been optimized). As such, the machine-learned visual attention model 314 can be utilized to generate an unsupervised training signal to further optimize the training of the machine-learned visual attention model 304. Alternatively, or additionally, in some implementations, the machine-learned visual location model 314 can be utilized alongside the machine-learned visual attention model 304 during the inference phase to generate a more optimal output (e.g., through an algorithmic combination/analysis of the visual attention value 318 and the three-dimensional visual location estimation 316, etc.).

Figure 4:
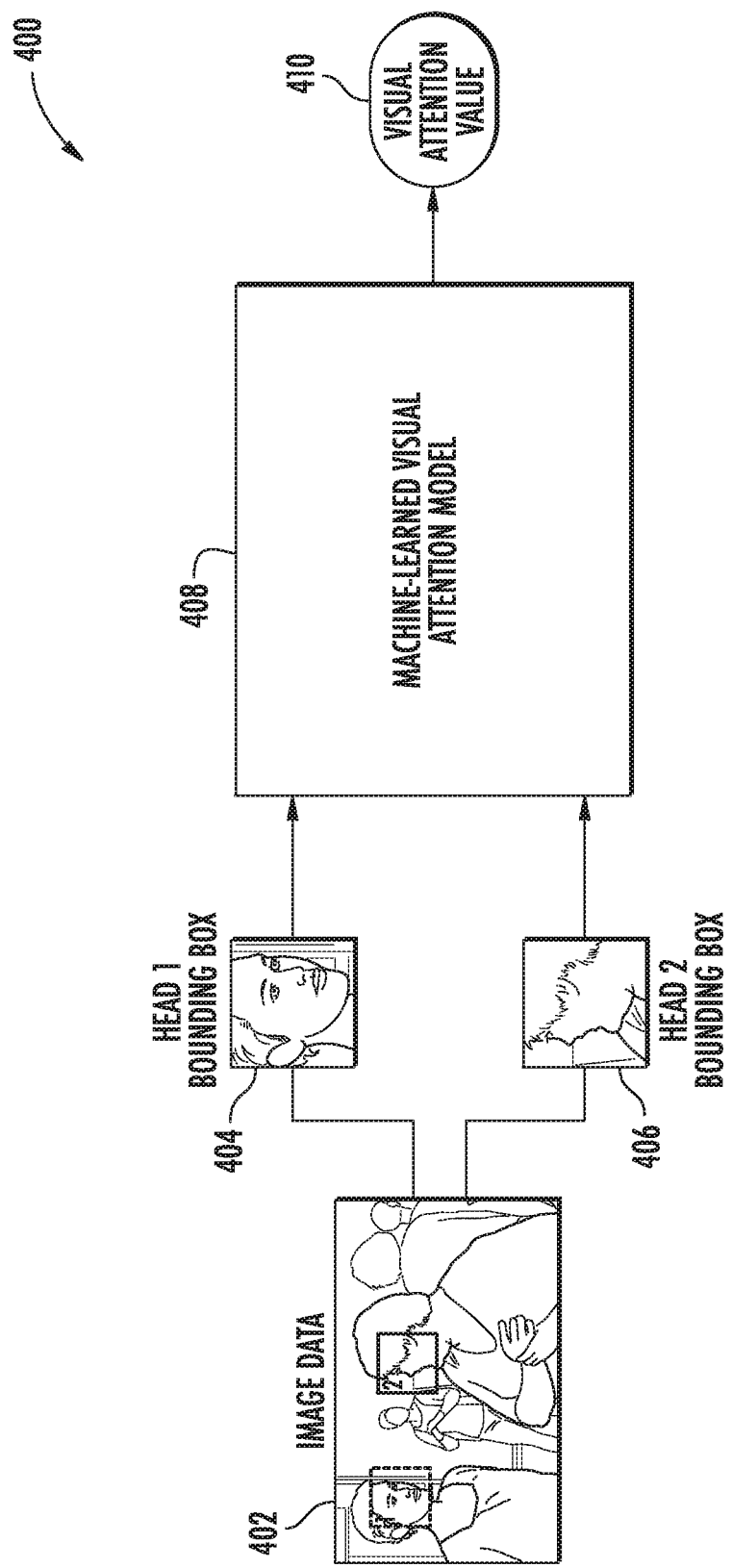
FIG. 4 is a data flow diagram depicting processing of image data depicting two people with a machine-learned visual attention model to determine if two people are looking at each other.

FIG. 4 is a data flow diagram 400 depicting processing of image data 402 depicting two people with a machine-learned visual attention model 408 to determine if two people are looking at each other. It should be noted that the processing of the image data 402 with the machine-learned visual attention model 408 to generate the visual attention value can be done in the same manner as described previously in FIG. 3.

Image data 402 can be obtained that includes a head 1 bounding box 404 and a head 2 bounding box 406. The head 1 bounding box 404 can correspond to the head of a first person depicted in the image data and the head 2 bounding box can correspond to the head of a second person depicted in the image data. The image data 402 can also include additional information regarding the size, position, location, and coordinates of the bounding box(es) 404 and 406 included as a ground truth of the image data (e.g., as image data characteristics, etc.). As an example, the image data 402 may include x/y coordinates for the center of each bounding box 404 and 406. As another example, the image data 402 may include a size of the image data inside each bounding box 404 and 406 (e.g., as a number of pixels, etc.). In some implementations, the image data can be obtained without bounding boxes (e.g., 406 and 408), and bounding boxes can be determined for the head(s) and/or additional entity(s) included in the image data 402 (e.g., using various machine-learning and/or conventional technique(s), etc.).

The image data 402 can be processed with the machine-learned visual attention model 408 to obtain the visual attention value 410. As the additional entity depicted by the image data 402 is the head of a second person (e.g., as defined by head 2 bounding box 406), the visual attention value 410 can indicate whether a visual attention of the first person is focused on the second person and whether a visual attention of the second person is focused on the first person. As such, the visual attention value 410 can be indicative of whether the persons (e.g., head 1 and head 2 of the bounding boxes 404/406) are looking at each other.

Figure 5:
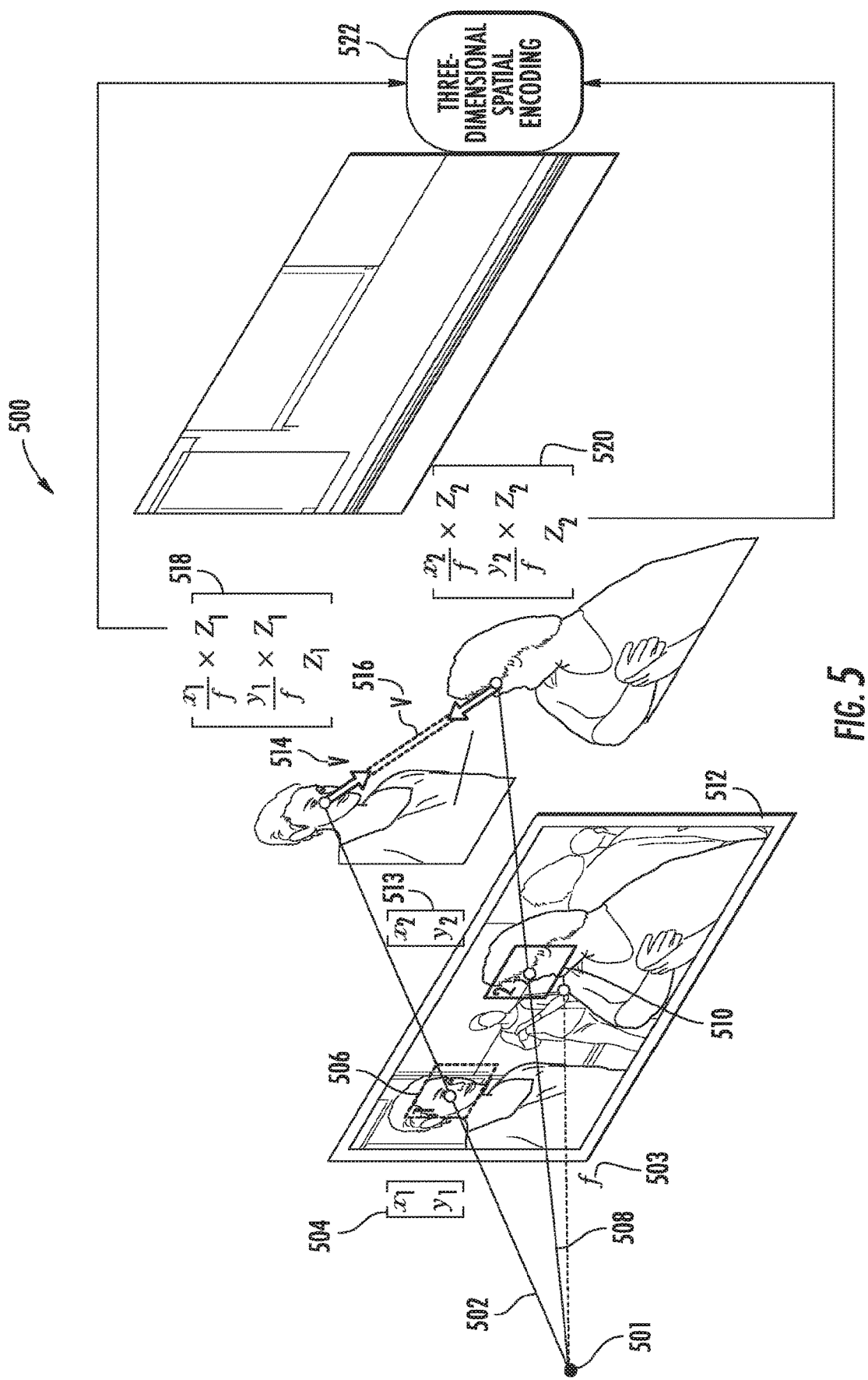
FIG. 5 is a data flow diagram depicting the generation of a three-dimensional spatial encoding based on image data according to example embodiments of the present disclosure.

FIG. 5 is a data flow diagram 500 depicting the generation of a three-dimensional spatial encoding based on image data 512 according to example embodiments of the present disclosure. As depicted, the image data 512 can depict two people looking at each other, where the first person's head is defined by bounding box 506 and the second person's head is defined by bounding box 510. Additionally, bounding box coordinates 504 and 513 are included (e.g., as an associated ground truth, etc.) for their respective bounding boxes 506 and 510.

More particularly, when two people (e.g., as defined by bounding boxes 506 and 510) are looking at each other, their 3D gaze directions roughly align with the direction of the relative 3D position vectors 514 and 516 between their head centers. Since the 3D gaze information is already available to the machine-learned visual attention model indirectly through the latent head encoding and the latent entity encoding (e.g., encodings 306 and 308 of FIG. 3, etc.), providing an estimated direction and/or location of the relative 3D head as an additional input feature proves to be beneficial for optimal training of the machine-learned visual attention model.

As such, under a pinhole camera projection model (e.g., as defined by camera center 501, focal length 503 and optical axes 502 and 508), the camera-centered 3D coordinates of the $i^{th}$ head center (e.g., the first head and the second head) for the heads defined by bounding boxes 506 and 510 can be estimated as:

$$\left[\frac{x_i}{f}Z_i, \frac{y_i}{f}Z_i, Z_i\right]$$

where f is the camera focal length 503, $(x_i, y_i)$ are the image coordinates 504 and 506 of the centers of the head bounding boxes 506 and 510 with an origin at the image center, and $Z_i$ is the distances of the head centers from the camera center 501 along the optical axes 502 and 508. Since the camera focal length 503 is generally not known, and the depth information is generally not needed to estimate the 3D head center coordinates 518 and 520, the camera focal length 503 can be approximated.

As such, the corresponding camera focal length 503 can be estimated using a maximum of width and height characteristics of the image data 512 (e.g., image data characteristics, etc.). The depth of a head can be assumed to be inversely proportional to the square root of the corresponding 2D bounding box (e.g., bounding boxes 506 and 510) area:

$$Z_i = \frac{\alpha}{\sqrt{A_i}}$$

where $\alpha$ is a proportionality constant. This is a coarse approximation since it assumes that the heads of different individuals are of the same size and the head detector gives same size bounding boxes for different individuals at the same depth. Using the above approximations, the direction (e.g., location) v of the relative 3D head position vector can be computed as:

$$v = \frac{\tilde{v}}{\|\tilde{v}\|_2}, \quad \tilde{v} = \left[\frac{1}{f}\left(\frac{x_2}{\sqrt{A_2}} - \frac{x_1}{\sqrt{A_1}}\right), \frac{1}{f}\left(\frac{y_2}{\sqrt{A_2}} - \frac{y_1}{\sqrt{A_1}}\right), \frac{1}{\sqrt{A_2}} - \frac{1}{\sqrt{A_1}}\right]$$

The proportionality constant $\alpha$ is not included in the above equation because it generally contributes to the magnitude of the relative 3D head position vector (e.g., three-dimensional visual location estimation) and not to the direction. The 3D head center coordinates 518 and 520, and/or the relative 3D position vectors 518 and 520, can be included in the three-dimensional spatial encoding 522. The overall spatial encoding can, for example, be an 11-dimensional feature vector that consists of 8-dimensional two-dimensional encoding and 3-dimensional three-dimensional spatial encoding 522.

It should be noted that the additional entity defined by bounding box 510 is depicted as the head of a second person merely to more easily illustrate aspects of the present disclosure. However, the depth of the heads depicted in the image data 512 is assumed to be inversely proportional to the square root of the corresponding 2D bounding box to estimate the depth of each head. More particularly, the depth estimation technique for the heads utilizes a statistical correlation between the dimensions of a bounding box and the dimensions of a head to estimate the depth of the heads depicted in the image data. As such, any other additional entity (e.g., an object, etc.) can be utilized in place of the head of the second person with the additional utilization of various depth estimation techniques (e.g., machine-learned depth estimation, depth sensor data, etc.) for both the head (e.g., as defined by the bounding box 506) and the additional object (e.g., as defined by the bounding box 506). As an example, if the additional entity described by the bounding box 510 was a sign, the three-dimensional visual location estimations 516 can be based on a depth provided by using one or more depth estimation techniques (e.g., a machine-learned depth estimation neural network, depth sensor data, etc.).

Example Methods

Figure 6:
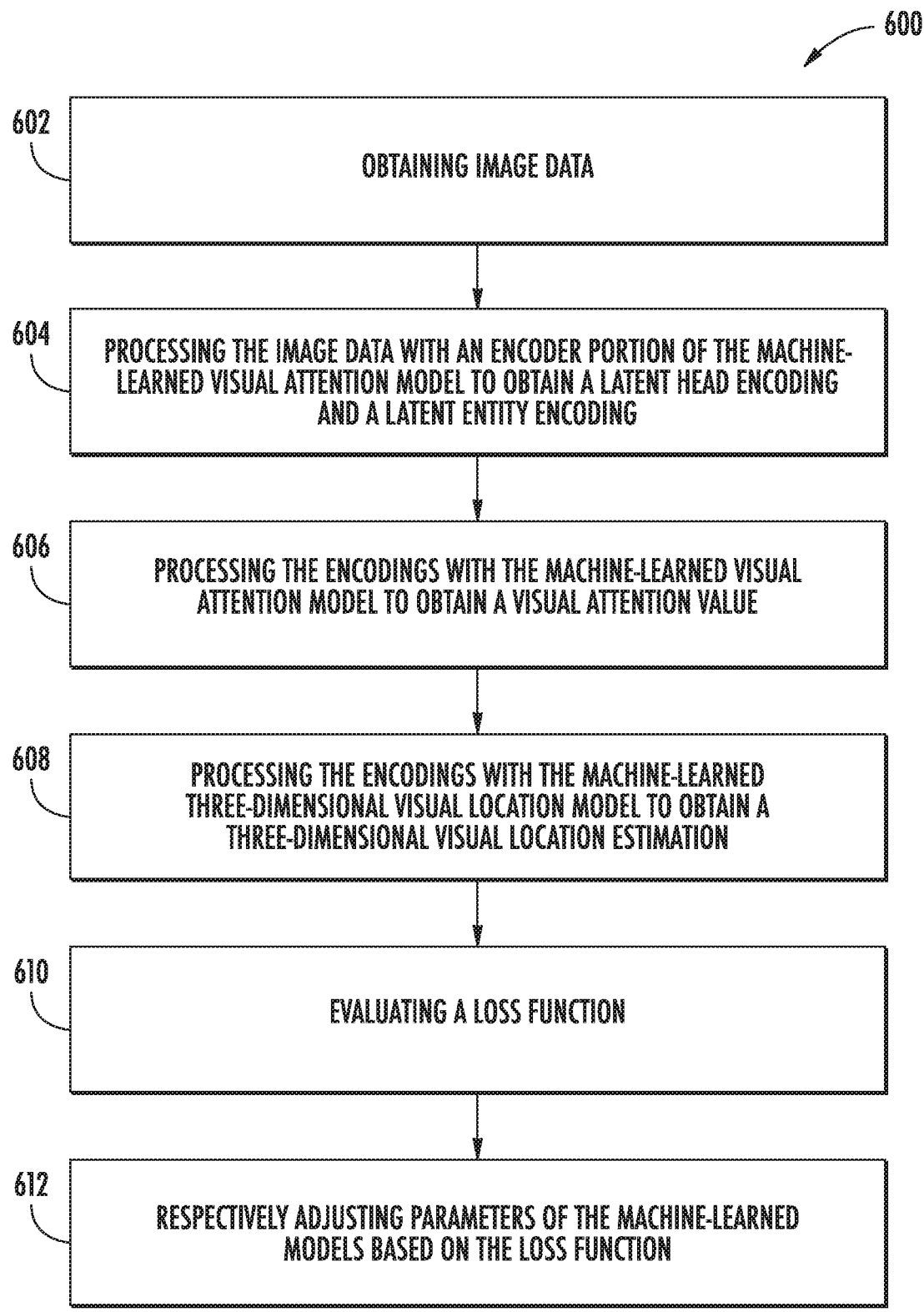
FIG. 6 depicts a flow chart diagram of an example method to perform end-to-end training of a machine-learned visual attention model and a machine-learned three-dimensional visual location model according to example embodiments of the present disclosure.

FIG. 6 depicts a flow chart diagram of an example method 600 to perform according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, the method can include obtaining image data. More particularly, the method can include obtaining image data and an associated ground truth visual attention label. The image data can depict at least a head of a person and an additional entity. The image data can be any image data captured by any sort of image capture device (e.g., digital camera, LIDAR sensor, etc.), and be or otherwise include data of any image data type (e.g., digital camera data, LIDAR data, etc.). In some implementations, the head of the person depicted in the image data can be a portion of the head of the person. As an example, the image data can depict the eyes of a person (e.g., as captured from an augmented reality device, a virtual reality device, a front-side smartphone image sensor, etc.). As such, the image data can, in some implementations, depict the face of a user of a computing device and a scene opposite that of the face of the user device (e.g., the environment that the user is viewing, etc.).

The additional entity depicted by the image data can be at least a portion of an object, person direction surface, space, machine-readable visual encoding, and/or any other entity depicted in the image data. As an example, the additional entity can be a surface of a building. As another example, the additional entity can be the head of another person. As another example, the additional entity can be a machine-readable visual encoding (e.g., a QR code, etc.). As another example, the additional entity can be a defined three-dimensional portion of space (e.g., a road intersection, a portion of three-dimensional space where a pedestrian could appear, etc.). As another example, the additional entity can be a direction. As another example, the additional entity can be an object (e.g., a computing device, a vehicle, a sign, etc.). As such, the additional entity can be any entity that can receive visual attention from a person.

In some implementations, the image data can include or otherwise depict bounding boxes respectively associated with the head of the person and the additional entity (e.g., as a ground truth of the image data). As an example, the image data may depict the head of a person and an additional entity that is a machine-readable visual encoding (e.g., a QR code). Two bounding boxes can be depicted in the image data that respectively define box areas around the head and the visual encoding. It should be noted that in some implementations, the image data can also include additional information regarding the size, position, location, and coordinates of the bounding box(es) included as a ground truth of the image data (e.g., as image data characteristics, etc.).

In some implementations, a spatial encoding feature vector can be generated based at least in part on a plurality of image data characteristics of the image data. The spatial encoding feature vector can include a two-dimensional spatial encoding and a three-dimensional spatial encoding. As an example, the spatial encoding feature vector can be an 11-dimensional feature vector that includes an 8-dimensional 2D spatial encoding and a 3-dimensional 3D spatial encoding.

In some implementations, the image data characteristics can include the dimensions, content, file size, file format, pixel count, and/or any other relevant characteristics of the image data. As an example, the image data characteristics may include a height value and a width value of the image data (e.g., a height/width pixel count, aspect ratio, etc.). As another example, the image data characteristics can include two-dimensional location coordinates for one or more of the bounding boxes included in the image data (e.g., the head bounding box, the additional entity bounding box, etc.). As yet another example, the image data characteristics can include an estimated camera focal length that was used to capture the image data (e.g., an estimation of the utilized camera focal length when the image data was captured, etc.). The estimated camera focal length can be estimated based at least in part on the height value and the width value of the image data.

In some implementations, the two-dimensional spatial encoding of the spatial encoding feature vector can describe one or more of the plurality of image data characteristics. As an example, the two-dimensional spatial encoding may describe the respective two-dimensional location coordinates within the image data for each of the head bounding box and the entity bounding box (e.g., normalized X/Y center coordinates of the boxes, etc.). As another example, two-dimensional spatial encoding may additionally or alternatively include a height value and a weight value of the image data. It should be noted that the two-dimensional spatial encoding does not necessarily need to describe each image data characteristic of the plurality of image data characteristics.

In some implementations, the three-dimensional spatial encoding of the spatial encoding feature vector can describe a pseudo three-dimensional relative position of both the head of the person and the additional entity. More particularly, three-dimensional spatial encoding can describe a relative position of the head of the person and the additional entity (e.g., their respectively relative positions in a three-dimensional space. As an example, the additional entity depicted by the image data can be a head of second person. The three-dimensional spatial encoding can describe a pseudo three-dimensional position of the first person's head relative to the second person's head and a pseudo three-dimensional position of the second person's head relative to the first person's head. In some implementations, the three-dimensional spatial encoding can additionally describe a pseudo three-dimensional gaze direction of the first person and/or the additional entity (e.g., if the additional entity is a second person).

At 604, the method can include processing the image data with an encoder portion of the machine-learned visual attention model. More particularly, the image data can be processed with an encoder portion of the machine-learned visual attention model to obtain a latent head encoding (e.g., an encoding of the head of the person) and a latent entity encoding (e.g., an encoding of the additional entity). The encoder portion of the machine-learned visual attention model can be one or more encoding layers of the model that are configured to generate both latent encodings. Alternatively, in some implementations, the encoder portion can be a machine-learned encoding submodel of the machine-learned visual attention model. In some implementations, the encoder portion can be a shared portion that can be used to generate encodings for both the head of the person and the additional entity. Alternatively, in some implementations, the encoder portion can include two encoder portions that are used separately for the head of the person and the additional entity without any sharing of parameters. The machine-learned visual attention model can be or otherwise include various machine-learned model(s) such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

As an example, the encoder portion of the machine-learned visual attention model can be or otherwise include a shared convolutional neural network with four two-dimensional convolutional layers that can output two 12-dimensional feature vectors for the head of the person and the additional entity respectively. As another example, the machine-learned visual attention model (e.g., including or excluding the encoder portion, etc.), can include a neural network that consists of three fully-connected layers with 16, 8, and 1 output nodes, respectively. The input to this neural network can be a 35-dimensional feature vector obtained by concatenating the latent head encoding, the latent entity encoding, and the spatial encoding feature vector. The first two layers of the network can use ReLU non-linearity, and the last layer can use a sigmoid function to generate the visual attention value in a [0,1] range (e.g., a binary visual attention value, etc.).

At 606, the method can include processing the encodings with the machine-learned visual attention model to obtain a visual attention value. More particularly, the latent head encoding and the latent entity encoding can be processed with the machine-learned visual attention model to obtain a visual attention value. The visual attention value can be indicative of whether a visual attention of the person is focused on the additional entity. In some implementations, the visual attention value can be a binary value indicating that the person is either looking at the additional entity or is not looking at the additional entity. Alternatively, in some implementations, the visual attention value can be a scalar value indicative of a degree of certainty as to whether the visual attention of the person is focused on the additional entity (e.g., a 75% certainty that the visual attention of the person is focused on the additional entity, etc.). Alternatively, in some implementations, the visual attention value can be indicative of a degree of visual attention focused on the additional entity.

In some implementations, the spatial encoding feature vector previously generated based on the image data characteristics can be input alongside the latent space head encoding and the latent space entity encoding to the machine-learned visual attention model to obtain the visual attention value. As an example, the latent head encoding, the latent entity encoding, and the spatial encoding feature vector can be concatenated to a 35-dimensional feature vector. This 35-dimensional feature vector can then be input to the machine-learned visual attention model to obtain the visual attention value.

At 608, the method can include processing the encodings with a three-dimensional visual location model to obtain a visual location estimation. More particularly, the latent head encoding and the latent entity encoding can be processed with a machine-learned three-dimensional visual location model to obtain a three-dimensional visual location estimation. The three-dimensional visual location estimation can include an estimated three-dimensional spatial location of the visual attention of the person. The machine-learned three-dimensional visual location model can be or otherwise include various machine-learned model(s) such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

As described previously, the three-dimensional visual location estimation can include an estimated three-dimensional spatial location of the visual attention of the person. As an example, the additional entity depicted in the image data can be a machine-readable visual encoding. The estimated three-dimensional spatial location of the visual attention can be the three-dimensional location of machine-readable visual encoding. As another example, the estimated three-dimensional spatial location of the visual attention can be described by a three-dimensional directional vector that is directed towards the location of the machine-readable visual encoding. As such, the three-dimensional visual location estimation can estimate a visual direction and/or a visual depth of the gaze of the person depicted in the image data At 610, the method can include evaluating a loss function. More particularly, a loss function can be evaluated that evaluates a difference between the three-dimensional visual location estimation and a pseudo visual location label derived from the image data. In some implementations, the pseudo visual location label can be based at least in part on the three-dimensional spatial encoding of the spatial encoding feature vector. As an example, the three-dimensional spatial encoding can include one or more 3D positioning vectors that describe a position and/or spatial direction of the head in a 3D space (e.g., and the additional entity if the additional entity is a second person, etc.). The 3D positioning vector(s) can be utilized as a pseudo visual location label, and the 3D location and/or direction of the head of the person indicated by the pseudo visual location label evaluated against the three-dimensional visual location estimation. As the pseudo visual location label is based at least in part on the spatial encoding feature vector, which is itself based at least in part on the coordinates of bounding boxes included in the image data (e.g., as a ground truth associated with the image data), the pseudo visual location label can provide an accurate unsupervised training signal that benefits from the known accuracy of a ground truth associated with the image data (e.g., the bounding box coordinates). In such fashion, the previously generated spatial encoding feature vector can be evaluated by the loss function as an unsupervised training signal to optimize the performance of both the machine-learned three-dimensional visual location model and the machine-learned visual attention model.

The loss function can also evaluate a difference between the visual attention value and the ground truth visual attention label. The ground truth visual attention label can be of the same type as the visual attention value (e.g., a binary value, an accuracy likelihood, etc.). As an example, the visual attention value can indicate that the visual attention of the person is focused on the additional entity and the ground truth visual attention label can indicate that the visual attention of the person is not focused on the entity. The loss function can evaluate the difference between the visual attention value and the ground truth visual attention label. As another example, the ground truth visual attention label can indicate a 55% likelihood that the visual attention of the person is focused on the additional entity. The ground truth visual attention label can indicate either indicate that the visual attention of the person is focused on the entity (e.g., a binary value) or a different degree of certainty that the visual attention of the person is focused on the additional entity (e.g., 25%, 75%, etc.). In such fashion, the loss function can evaluate a difference between both the visual attention value and the ground truth visual attention label, and the three-dimensional visual location estimation and the pseudo visual location label, and can be backpropagated to train both the machine-learned visual attention model and the machine-learned three-dimensional visual location model to train the models in an end-to-end fashion At 612, the method can include respectively adjusting parameters of the machine-learned models based on the loss function. More particularly, based at least in part on the loss function, parameter(s) of the machine-learned visual attention model and the machine-learned three-dimensional visual location model can be adjusted. More particularly, the differences evaluated by the loss function can be backpropagated through both models separately and simultaneously. For example, the loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

More particularly, the machine-learned visual attention model and the machine-learned three-dimensional visual location model can, in some implementations, be trained in an end-to-end fashion starting from randomly initialized weights using two loss functions: binary cross entropy loss $\mathcal{L}_{bce}$ on the visual attention value(s) and $\mathcal{L}_2$ loss on the three-dimensional visual location estimates. While the visual attention value loss can be used for both positive and negative visual attention samples, the three-dimensional visual location estimation loss can generally be used only for positive (e.g., a label indicating that the person is focusing their visual attention on the additional entity, etc.) visual attention value samples (e.g., using the pseudo visual location label). The overall loss function used for such training can be defined as:

$$\mathcal{L} = \mathcal{L}_{bce}(\hat{l}, l) + \lambda l \left( \frac{\mathcal{L}_2(\hat{g}_1, v) + \mathcal{L}_2(\hat{g}_2, -v)}{2} \right),$$

where $l \in \{0,1\}$ is the binary ground truth visual attention label, $\hat{l} \in [0,1]$ is the predicted visual attention value score, $\hat{g}_1$ and $\hat{g}_2$ are the respective three-dimensional visual location estimates for a first head and a second head (e.g., assuming that the additional entity is a second head of a second person, etc.), respectively, and $\lambda$ is a hyper-parameter to balance the importance of two loss functions Additional Disclosure The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for training a machine-learned visual attention model, the method comprising:
    obtaining, by a computing system comprising one or more computing devices, image data and an associated ground truth visual attention label, wherein the image data depicts at least a head of a person and an additional entity;
    processing, by the computing system, the image data with an encoder portion of the machine-learned visual attention model to obtain a latent head encoding and a latent entity encoding;
    processing, by the computing system, the latent head encoding and the latent entity encoding with the machine-learned visual attention model to obtain a visual attention value indicative of whether a visual attention of the person is focused on the additional entity;
    processing, by the computing system, the latent head encoding and the latent entity encoding with a machine-learned three-dimensional visual location model to obtain a three-dimensional visual location estimation, wherein the three-dimensional visual location estimation comprises an estimated three-dimensional spatial location of the visual attention of the person;
    evaluating, by the computing system, a loss function that evaluates a difference between the three-dimensional visual location estimation and a pseudo visual location label derived from the image data and a difference between the visual attention value and the ground truth visual attention label; and
    respectively adjusting, by the computing system, one or more parameters of the machine-learned visual attention model and the machine-learned three-dimensional visual location model based at least in part on the loss function.

2. The computer-implemented method of claim 1, wherein:
    the head of the person and the additional entity are respectively defined within the image data by a head bounding box and an entity bounding box;
    obtaining, by the computing system, the image data further comprises generating, by the computing system, a spatial encoding feature vector based at least in part on a plurality of image data characteristics of the image data, wherein the spatial encoding feature vector comprises a two-dimensional spatial encoding and a three-dimensional spatial encoding; and
    the spatial encoding feature vector is input alongside the latent space head encoding and the latent space entity encoding to the machine-learned visual attention model to obtain the visual attention value.

3. The computer-implemented method of claim 2, wherein:
    the two-dimensional spatial encoding describes one or more of the plurality of image data characteristics; and
    the plurality of image data characteristics comprise:
        respective two-dimensional location coordinates within the image data for each of the head bounding box and the entity bounding box; and
        a height value and a width value of the image data.

4. The computer-implemented method of claim 2, wherein:
    the plurality of image data characteristics comprise:
        respective two-dimensional location coordinates within the image data for each of the head bounding box and the entity bounding box;
        an estimated camera focal length corresponding to the image data, wherein the estimated camera focal length is based at least in part on a height value and a width value of the image data;
        respective depth estimates for each of the head of the person and the entity, wherein the respective estimated depths are based at least in part on the estimated camera focal length; and
    the three-dimensional spatial encoding describes a pseudo three-dimensional relative position of both the head of the person and the additional entity.

5. The computer-implemented method of claim 4, wherein the pseudo visual location label is based at least in part on the three-dimensional spatial encoding.

6. The computer-implemented method of claim 1, wherein the additional entity comprises at least a portion of:
    an object;
    a person;
    a direction;
    a machine-readable visual encoding;
    a surface; or
    a space.

7. The computer-implemented method of claim 1, wherein:
    the additional entity comprises a head of a second person; and
    the visual attention value is indicative of whether both the visual attention of the person is focused on the head of the second person and a visual attention of the second person is focused on the head of the person.

8. The computer-implemented method of claim 7, wherein the three-dimensional visual location estimation comprises the estimated three-dimensional spatial location of the visual attention of the person and an estimated three-dimensional spatial location of the visual attention of the second person.

9. The computer-implemented method of claim 1, wherein the visual attention value is a binary value.

10. The computer-implemented method of claim 1, wherein at least one of the machine-learned visual attention model or the machine-learned three-dimensional visual location model comprises one or more convolutional neural networks.

11. The computer-implemented method of claim 1, wherein:
the additional entity comprises a head of a second person; and
the method further comprises:
obtaining, by the computing system, second image data depicting at least a third head of a third person and a fourth head of a fourth person;
processing, by the computing system, the second image data with the machine-learned visual attention model to obtain a second visual attention value, wherein the second visual attention value is indicative of whether both a visual attention of the third person is focused on the fourth person and a visual attention of the fourth person is focused on the third person; and
determining, by the computing system based at least in part on the visual attention value, that the third person and the fourth person are looking at each other.

12. A computing system for visual attention tasks, comprising:
one or more processors;
a machine-learned visual attention model, the machine-learned visual attention model configured to:
receive image data depicting at least a head of a person and an additional entity; and
generate, based on the image data, a visual attention value, wherein the visual attention value is indicative of whether a visual attention of the person is focused on the additional entity; and
one or more tangible, non-transitory computer readable media storing computer-readable instructions that when executed by the one or more processors cause the one or more processors to perform operations, the operations comprising:
obtaining image data that depicts the at least the head of the person and the additional entity;
processing the image data with the machine-learned visual attention model to obtain the visual attention value indicative of whether the visual attention of the person is focused on the additional entity, wherein the machine-learned visual attention model is trained based at least in part on an output of a machine-learned three-dimensional visual location model, wherein the output of the machine-learned three-dimensional visual location model comprises an estimated three-dimensional spatial location of the visual attention of at least the person; and
determining, based at least in part on the visual attention value, whether the person is looking at the additional entity.

13. The computing system of claim 12, wherein the additional entity comprises:
an object;
a person;
a direction;
a machine-readable visual encoding
a surface; or
a space.

14. The computing system of claim 12, wherein determining, based at least in part on the visual attention value, whether the person is looking at the additional entity comprises determining, based at least in part on the visual attention value, that the person is not looking at the additional entity.

15. The computing system of claim 12, wherein:
the additional entity comprises at least a head of a second person;
the visual attention value is indicative of whether both the visual attention of the person is focused on the head of the second person and a visual attention of the second person is focused on the head of the person; and
determining, based at least in part on the visual attention value, whether the person is looking at the additional entity comprises determining, based at least in part on the visual attention value, that the person and the second person are looking at each other.

16. The computing system of claim 15, wherein the operations further comprise labeling the image data with a label that indicates that the image data depicts two people looking at each other.

17. The computing system of claim 12, wherein:
the additional entity is a moving vehicle; and
the operations further comprise providing, based at least in part on whether the person is looking at the additional entity, one or more instructions configured to execute an action.

18. The computing system of claim 12, wherein:
the additional entity is a machine-readable visual encoding descriptive of one or more actions performable by the computing system; and
the operations further comprise performing the one or more actions indicated by the machine-readable visual encoding.

19. The computing system of claim 18, wherein the one or more actions comprise at least one of:
providing data to a second computing system via one or more networks;
retrieving data from the second computing system via the one or more networks;
establishing a secure connection with the second computing system, the secure connection configured to facilitate one or more secure transactions;
providing image data to a display device of a user of the computing system, the image data depicting at least one of:
one or more augmented reality objects, wherein the one or more augmented reality objects are two-dimensional or three-dimensional;
one or more two-dimensional images;
one or more portions of text;
a virtual reality environment;
a webpage; or
a video; or
providing data to a computing device of the user of the computing system.

20. One or more tangible, non-transitory computer readable media storing computer-readable instructions that when executed by one or more processors cause the one or more processors to perform operations, the operations comprising:

obtaining image data that depicts at least a head of a person and an additional entity;

processing the image data with a machine-learned visual attention model to obtain a visual attention value, wherein the visual attention value is indicative of whether a visual attention of the person is focused on the additional entity, wherein the machine-learned visual attention model is trained based at least in part on an output of a three-dimensional visual location model, wherein the output of the three-dimensional visual location model comprises an estimated three-dimensional spatial location of the visual attention of at least the person; and determining, based at least in part on the visual attention value, whether the person is looking at the additional entity.

* * * * *